United States Patent [19]

Yamamoto

[11] Patent Number: 4,472,023
[45] Date of Patent: Sep. 18, 1984

[54] HIGH RESOLUTION IMAGE FORMING OPTICAL SYSTEM

[75] Inventor: Kimiaki Yamamoto, Hachiouji, Japan

[73] Assignee: Olympus Optical Co., Ltd., Tokyo, Japan

[21] Appl. No.: 393,520

[22] Filed: Jun. 29, 1982

[30] Foreign Application Priority Data

Jul. 6, 1981 [JP] Japan ................................ 56-104361

[51] Int. Cl.³ .......................... G02B 21/12; G02B 5/18
[52] U.S. Cl. .............................. 350/162.11; 350/448; 350/509
[58] Field of Search ..................... 350/162.11, 162.12, 350/162.13, 162.14, 448, 509, 440

[56] References Cited

U.S. PATENT DOCUMENTS 3,476,457  11/1969  Nomarski et al. .

OTHER PUBLICATIONS

Kingslake, Rudolf, *Applied Optics and Optical Engineering*, 1967, vol. #4, pp. 67–70.

*Primary Examiner*—Bruce Y. Arnold
*Assistant Examiner*—William Propp
*Attorney, Agent, or Firm*—Cushman, Darby & Cushman

[57] ABSTRACT

A high resolution image forming optical system provided with an annular aperture stop arranged near the front side focal plane of a condenser lens and an annular filter arranged in a position conjugate with the annular aperture stop with respect to the optical system including the condenser lens and an objective in order to improve the image-forming performance.

1 Claim, 3 Drawing Figures

HIGH RESOLUTION IMAGE FORMING OPTICAL SYSTEM

BACKGROUND OF THE INVENTION

1. Field of the Invention

This invention relates to an image-forming optical system for forming the image of an object illuminated by an auxiliary illuminating system and, more particularly, to a high resolution image forming optical system improved in the image-forming performance.

2. Description of the Prior Art

As means of improving the resolution in an image forming optical system with an auxiliary illuminating system as a microscope, IC printer or outline projector, there have been used the following methods. One of them is a method wherein the numerical aperture (N.A.) is made large as carried out in such objective as, for example, of a microscope. However, as a result of improvements for a long time, the N.A. of an objective has become so large as to be substantially close to the limit and it is very difficult to design an objective of N.A. larger than that of today. Therefore, not only the image forming optical system but also the illuminating system is expected to be improved because generally the resolution of an optical system provided with such auxiliary optical system as is mentioned above depends on the coherence of the illuminating system and therefore the improvement of the illuminating method contributes to the elevation of the resolution. An annular illuminating system is known as one of such illuminating method in which the resolution is improved by utilizing this fact. It is a method wherein an annular aperture stop is arranged in the same position as an aperture stop usually placed in a microscope or the like and is made a secondary light source to illuminate an object. This annular illuminating method generally increases the high frequency response but reduces the low frequency response. Therefore, it reduces the contrast of the image. Thus, it has defects that no effect can be developed in observing the microstructure of specimen with low contrast such as a biotic object and a substantially high resolution image formation is hard to obtain.

The inventor of the present invention has already filed a Japanese patent application No. 88428/1979 (See the gazette of Japanese patent laid open No. 12615/1981) suggesting a high resolution optical system in which the above mentioned defects are eliminated.

It is an optical system of such formation as is shown in FIG. 1 in which an annular aperture stop 1 is arranged near the front side focal plane of a condenser lens 2 and is illuminated from the left side in the drawing by a light source (not illustrated) so as to make the aperture of this annular aperture stop a secondary light source to illuminate an object surface 3 through the condenser lens 2. An annular absorbing filter 5 is arranged in a position in which the image of the annular aperture stop 1 is formed by the light (0th diffracted) having directly entered an objective 4 without being diffracted by the object among the illuminating lights having thus illuminated the object so that the object image may be formed on an expected image plane 6 by the 0th diffracted light properly weakened by this annular absorbing filter 5 and the 1st, 2nd, . . . diffracted lights. It has been made clear that, according to the optical system of such formation, a high response is shown from a low frequency range to a high frequency range (spatial frequency) and a high resolution image formation is obtained.

SUMMARY OF THE INVENTION

A primary object of the present invention is to further improve such high resolution image forming system as is described above to provide an image forming optical system having a higher resolution.

According to the present invention, this object is attained by a formation wherein an annular aperture stop is arranged near the front side focal plane of a condenser lens, and an annular filter which can absorb a part of the 0th diffracted light is arranged in a position conjugate with the ring-like aperture stop with respect to an optical system including the condenser lens and an objective so as to give for other diffracted lights than the 0th a phase advance of $\theta \leq \pi/6$.

The image forming optical system according to the present invention is simple in the formation, has a resolution higher than of a conventional high resolution optical system and makes it possible to observe a phase object.

DESCRIPTION OF THE PREFERRED EMBODIMENT

Figure 1:
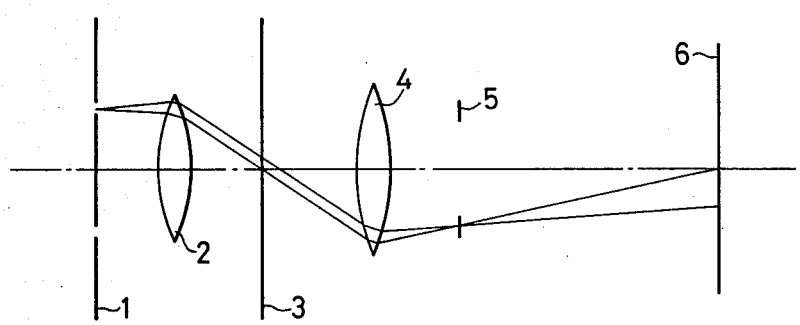
FIG. 1 is a view showing the formation of a high resolution optical system according to the present invention.

The detailed contents of the image forming optical system of the present invention shall be explained in the following. The formation of the optical system is similar to that of the conventional high resolution optical system shown in FIG. 1. In the conventional optical system, an annular filter having an action of only absorbing and reducing the 0th diffracted light is used but, in the optical system of the present invention, such filter absorbing the 0th diffracted light and giving a phase variation is used so as to give a higher resolution.

The reason therefor shall be explained in the following. In the optical system in FIG. 1, the intensity distribution $I(\vec{v})$ of the object image can be given by the following formula (1):

$$I(\vec{v}) = \int\int T(\vec{x}_1,\vec{x}_2)a(\vec{x}_1)a^*(\vec{x}_2) \exp[2\pi i \vec{v}(\vec{x}_1 - \vec{x}_2)]d\vec{x}_1 d\vec{x}_2 \quad (1)$$

In the above mentioned formula (1), $a(\vec{x})$ represents an object spectrum, * represents a complex conjugate and $T(\vec{x}_1,\vec{x}_2)$ is represented by the following formula (2).

$$T(\vec{x}_1,\vec{x}_2) = \int s(\vec{q})p(\vec{q}+\vec{x}_1)p^*(\vec{q}+\vec{x}_2)d\vec{q} \quad (2)$$

where $s(\vec{q})$ represents a irradiance distribution of the annular stop and $p(\vec{q})$ represents a pupil function of the objective. By the way, the characteristics of the annular filter are considered to be included in $p(\vec{q})$.

In the above mentioned formulas (1) and (2), the two dimensional coordinate system is represented by a vector, the coordinates on the object and image plane are represented by diffraction units and the coordinates on the pupil are normalized so that the maximum radius may be 1.

Now, in considering the characteristics of the formula (1) in the spatial frequency range, if the formula (1) is Fourier-transformed, it will be of the following formula (3). By the way, the Fourier-transformed quantity shall be represented by attaching ~ hereinafter.

$$\tilde{I}(\vec{x}) = \int T(\vec{x}'+\vec{x},\vec{x}')\tilde{a}(\vec{x}'+\vec{x})\tilde{a}^*(\vec{x}')d\vec{x}' \quad (3)$$

Here, if the object spectra have lines and are represented by the following formula (4).

$$\tilde{a}(\vec{x}) = \delta(\vec{x}) + \tilde{b}(\vec{x}) \quad (4)$$

where $\delta(\vec{x})$ represents a delta function, then, the formula (3) will be like the formula (5).

$$\tilde{I}(\vec{x}) = T(\vec{x},0)\delta(\vec{x}) + \tilde{b}(\vec{x})T(\vec{x},0) + \tilde{b}^*(-\vec{x})T(0,-\vec{x}) + \int T(\vec{x}'+\vec{x},\vec{x}')\tilde{b}(\vec{x}'+\vec{x})\tilde{b}^*(\vec{x}')d\vec{x}' \quad (5)$$

In case $|\tilde{b}(\vec{x})|$ is small and $|\tilde{b}(\vec{x})|^2 << |\tilde{b}(\vec{x})|$ in the above formula (5), the fourth term will be considered to be negligible and therefore the formula (5) will be like the following formula (6).

$$\tilde{I}(\vec{x}) = T(\vec{x},0)\delta(\vec{x}) + \tilde{b}(\vec{x})T(\vec{x},0) + \tilde{b}^*(-\vec{x})T(0,-\vec{x}) \quad (6)$$

That is to say, the optical system can be considered to be of a linear type.

Such system will hold in case a small object is present in a bright background or in case even a large object is a low contrast or low phase object. In most other cases that generally the object is present in a bright background, the system will be considered to approximately hold.

Now, if the irradiance distribution of the annular slit and the pupil function of the objective are symmetrical with respect to the optical axis, the following formula (7) will be obtained from the formula (2).

$$T(0,-\vec{x}) = T^*(\vec{x},0) \quad (7)$$

Further, if the complex amplitude distribution $a(\vec{u})$ of the object is written as follows by considering the phase $\phi(\vec{u})$ to be small $$\begin{aligned} a(\vec{u}) &= \{1 + c(\vec{u})\}e^{i\phi(\vec{u})} \\ &\approx 1 + c(\vec{u}) + ig(\vec{u}) \\ &= 1 + b(\vec{u}) \end{aligned} \quad (8)$$

the following formulas (9) and (10)

$$\tilde{b}(\vec{x}) = \tilde{c}(\vec{x}) + i\tilde{g}(\vec{x}) \quad (9)$$

$$\tilde{b}^*(-\vec{x}) = \tilde{c}(\vec{x}) - i\tilde{g}(\vec{x}) \quad (10)$$

will hold.

Therefore, if the formulas (7), (9) and (10) are substituted in the formula (6), the following formula will be obtained:

$$\tilde{I}(\vec{x}) = T(\vec{x},0)\delta(\vec{x}) + 2\tilde{c}(\vec{x})ReT(\vec{x},0) - 2\tilde{g}(\vec{x})ImT(\vec{x},0) \quad (11)$$

where Re and Im are operators representing respectively a real number part and imaginary number part.

By the way, in the formula (8), $$g(\vec{u}) = \{1 + c(\vec{u})\}\phi(\vec{u}) \quad (12)$$

and $c(\vec{u})$ will have a value only in the range in which the object is present in the case of a small object present in a bright background.

$$c(\vec{u}) = \begin{cases} c(\vec{u}) & |\vec{u}_1| < |\vec{u}| \leq |\vec{u}_2| \\ 0 & \text{range other than the above} \end{cases} \quad (13)$$

The range may be considered to be other than the above mentioned range.

Here, in considering the characteristics of such object as a microscope specimen, the object is not considered to have the same refractive index as of its surrounding and it is general that, even if an absorbing object (amplitude object) is concerned, it will have a phase different from the surrounding. Further, it is usual that it delays in the phase from the surrounding.

Therefore, now, if the phase of the object is assumed to be $\phi(u) = -\phi' = $ constant and $ImT(0,0) = 0$ is considered, the formula (11) will be able to be transformed as in the formula (14).

$$\tilde{I}(\vec{x}) = T(\vec{x},0)\delta(\vec{x}) + 2\tilde{c}(\vec{x})[ReT(\vec{x},0) + \phi'ImT(\vec{x},0)] \quad (14)$$

Here, $\tilde{I}(\vec{x})$ represents a Fourier-transform of the intensity distribution $I(\vec{v})$ of the image and the spectrum distribution of the image in the spatial frequency range. Further, as it is considered that $\delta(\vec{x}) + 2c(\vec{x})$ represents the spectrum of the object intensity distribution in such linear type system, if $R(\vec{x}) = ReT(\vec{x},0) + \phi'ImT(\vec{x},0)$ is properly normalized, it will become similar to the response function.

Therefore, it is considered to be more preferable that the annular filter for high resolution microscopes should have such characteristic that $R(\vec{x})$ given by the following formula (15) becomes larger.

$$R(\vec{x}) = ReT(\vec{x},0) + \phi'ImT(\vec{x},0) \quad (15)$$

In the above mentioned formula (15), $ImT(\vec{x},0)$ in the second term will be 0 when the filter gives no phase shift but will have a value at the time of such characteristic as gives a phase shift. Therefore, the annular filter not only weakening the intensity of the 0th diffracted light but also properly giving a phase shift is considered to be effective for high resolution microscopes. By the way, in this case, for the object delaying in the phase as described above, $\phi(u) = -\phi'$, therefore, from the formula (15), when $ImT(\vec{x},0)$ is positive, $R(\vec{x})$ will be larger. On the contrary, for the object advancing in the phase, when $ImT(\vec{x},0)$ is negative, $R(\vec{x})$ will be larger. Therefore, the phase shift amount may be given so that, when the phase of an object delays, the phase of the 0th diffracted light may be advanced and, when the phase of the object has advanced though rarely in fact, the phase of the 0th diffracted light may be delayed.

Now, as an example, such case that an annular filter of a large transmission coefficient and an infinitesimally small width is placed on the extreme peripheral side of the pupil of a lens shall be considered.

In such case, if $R(\vec{x})$ of the formula (15) is determined by considering the formula (2) and $R'(\vec{x})$ obtained by normalizing this $R(\vec{x})$ with $T(0,0) = 2\pi t^2$ is considered, it will be represented as follows when the spatial frequency $\vec{x}$ is $\vec{x} \neq 0$, $$R'(|\vec{x}|) = \frac{\beta}{\pi t}(\cos\theta + \phi'\sin\theta) \quad (16)$$

-continued $$\text{where } \beta = \cos^{-1}\frac{|\vec{x}|}{2}.$$

Therefore, as compared with the case of $\theta=0$ when no filter phase shift is given, the case of giving such phase shift as in the following to the annular filter is considered to be superior to the case of giving no phase shift.

$$1 < \cos\theta + \phi' \sin\theta \tag{17}$$

This formula (17) will hold when $\theta < 2\tan^{-1}\phi'$.

Figure 2:
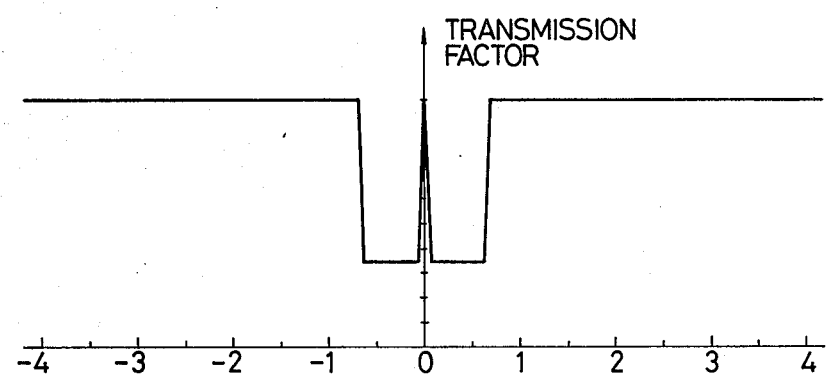
FIGS. 2 and 3 are diagrams showing respectively an intensity transmission factor distribution of an object and image characteristics for the object.
Figure 3:
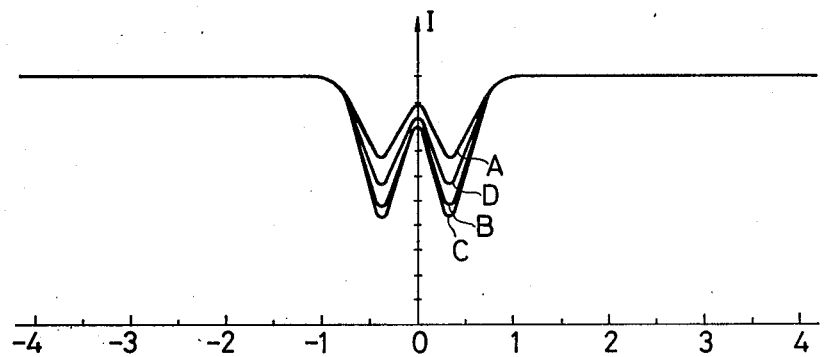

In FIGS. 2 and 3, the above fact is identified by simulation. In FIG. 3 of these diagrams, two small disk-like objects having such value of the intensity transmission coefficient as is shown in FIG. 2 and delayed in the phase by $0.1\pi$ from the periphery are assumed and the image characteristic obtained when an annular filter of a small width and an intensity transmission coefficient of 0.3 is placed on the peripheral side of a lens pupil is calculated for three filters different in the phase shift amount $\theta$.

The calculation was made by using the formula (1). In FIG. 3, the curve B is of the case of $\theta=0$ (no phase shift), the curve C is of the case of $\theta=\pi/6$ and the curve D is of the case of $\theta=\pi/3$. The curve A is of the case that no annular filter was used, shows the image characteristic of only an annular illumination and is shown for information.

As clear from FIG. 3, in a high resolution microscope using an annular filter, the curve C of when a phase shift is properly given is superior in both contrast and resolution to the curve B of when no phase shift is given. That is to say, in the illustrated examples, the case of $\theta=(\pi)/6$ is the best. The phase of an object is different in each object and therefore the desirable value of $\theta$ is also different. $\theta$ had better be small. $|\theta| \leq (\pi)/6$ is generally preferable.

As explained above, it is considered to be clear that, in case an object has a phase, the annular filter had better give not only an absorption but also a proper amount of a phase shift in a high resolution microscope.

This can be known to be practically excellent from the reason explained in the following.

Now, the image of a phase object having no bright and dark structure but having only a small phase variation shall be considered.

In this case, $c(\vec{u})=0$ in the formula (8), $g(\vec{u})=\phi(\vec{u})$ from the formula (12) and therefore the formulas (9) and (10) become respectively $$\vec{b}(\vec{x})=i\vec{\phi}(x) \text{ and } \vec{b}^*(-\vec{x})=-i\vec{\phi}(x).$$

If these formulas are substituted in the formula (6), the following formula will be obtained.

$$\vec{I}(\vec{x})=T(\vec{x},0)\delta(\vec{x})-2\vec{\phi}(\vec{x})ImT(\vec{x},0) \tag{18}$$

That is to say, if $ImT(\vec{x},0)$ is not 0 but has a value, the phase object will be able to be made visible.

In order to make $ImT(\vec{x},0)$ maximum, a phase shift of $\theta=\pi/2$ may be given to the annular filter but this is a phase contrast microscope itself. Even if $\theta$ is not $\theta=\pi/2$, if there is even a small phase shift amount, $ImT(\vec{x},0)$ of the formula (18) will have a value. Therefore, there are advantages that, as in the present invention, if such annular filter as gives even any amount of a phase shift is used in a high resolution microscope of such formation as in FIG. 1, not only a high resolution will be obtained for an amplitude object but also the structure of such phase object as will not be seen when no phase shift is given will be able to be observed.

I claim:

1. A high resolution optical system comprising a condenser lens, an annular aperture stop arranged near the front side focal plane of said condenser lens, an objective arranged on the opposite side of said annular aperture stop with respect to said condenser lens, and an annular filter arranged in a position conjugate with said annular aperture stop with respect to the optical system including said condenser lens and objective, said annular filter being formed so as to absorb a part of the zero order diffracted light and to give a phase advance of $\theta \leq (\pi)/6$ to other diffracted light than the zero order light.

* * * * *